(12) United States Patent
Glazier et al.

(10) Patent No.: US 9,323,938 B2
(45) Date of Patent: Apr. 26, 2016

(54) HOLISTIC XACML AND OBLIGATION CODE AUTOMATICALLY GENERATED FROM ONTOLOGICALLY DEFINED RULE SET

(75) Inventors: Jason S. Glazier, Newtown, PA (US); Bryan J. Aucoin, Alexandria, VA (US); Stephen F. DeAngelis, Washington Crossing, PA (US); Peter A. Wagner, Herndon, VA (US)

(73) Assignee: Enterra Solutions, LLC, Newtown, PA (US)

( * ) Notice: Subject to any disclaimer, the term of this patent is extended or adjusted under 35 U.S.C. 154(b) by 1242 days.

(21) Appl. No.: 12/347,042

(22) Filed: Dec. 31, 2008

(65) Prior Publication Data

US 2009/0320093 A1   Dec. 24, 2009

Related U.S. Application Data

(60) Provisional application No. 61/009,616, filed on Dec. 31, 2007.

(51) Int. Cl.
*G06F 17/00* (2006.01)
*G06F 21/60* (2013.01)
*G06F 9/44* (2006.01)

(52) U.S. Cl.
CPC ............. *G06F 21/604* (2013.01); *G06F 8/10* (2013.01); *G06F 8/35* (2013.01)

(58) Field of Classification Search
CPC ................... G06F 17/30734; G06F 21/604
USPC ............................................. 726/1
See application file for complete search history.

(56) References Cited

U.S. PATENT DOCUMENTS

| | | | |
|---|---|---|---|
| 6,876,314 | B1 | 4/2005 | Lin |
| 7,350,237 | B2 | 3/2008 | Vogel et al. |
| 2003/0084423 | A1 | 5/2003 | Clegg et al. |
| 2003/0220880 | A1* | 11/2003 | Lao et al. ............. 705/51 |
| 2005/0204055 | A1 | 9/2005 | Martinez et al. |
| 2006/0143464 | A1 | 6/2006 | Ananthanarayanan et al. |
| 2006/0161888 | A1 | 7/2006 | Lovisa et al. |
| 2007/0156727 | A1 | 7/2007 | Lim |
| 2008/0127303 | A1 | 5/2008 | Wrighton et al. |

OTHER PUBLICATIONS

Moses, "Extensible Access Control Markup Language (XACML) Version 2.0."*
Abou-Tair, "An Ontologt-Based Approach for Managing and Maintaining Privacy in Information Systems."*
"eXtensible Access Control Markup Language (XACML) Version 2.0," OASIS Standard, Feb. 1, 2005.

* cited by examiner

*Primary Examiner* — Andrew Georgandellis
(74) *Attorney, Agent, or Firm* — K&L Gates LLP (57) ABSTRACT

Computer-based systems and methods for automatically generating both XACML rules and processed-based obligation code using a common ontologically defined ruleset.

19 Claims, 5 Drawing Sheets

HOLISTIC XACML AND OBLIGATION CODE AUTOMATICALLY GENERATED FROM ONTOLOGICALLY DEFINED RULE SET

PRIORITY CLAIM

The present application claims priority to U.S. provisional patent application Ser. No. 61/009,616, filed 31 Dec. 2007, which is incorporated herein by reference in its entirety.

BACKGROUND eXtensible Access Control Markup Language ("XACML") is a declarative access control policy language implemented in XML describing how to interpret policies for authorization to network resources. According to the Organization for the Advancement of Structured Information Standards (OASIS), the consortium that developed the XACML standard:

XACML enables the use of arbitrary attributes in policies, role-based access control, security labels, time/date-based policies, indexable policies, "deny" policies, and dynamic policies—all without requiring changes to the applications that use XACML. Adoption of XACML across vendor and product platforms provides the opportunity for organizations to perform access and access policy audits directly across such systems.

XACML version 2.0 was approved in February 2005, and version 3.0 is currently in preparation.

SUMMARY

One current flaw with the XACML specification identified by the inventors is that the policy rules for security authorization to a resource reside in multiple places. They usually reside in both XACML files accessed by a Policy Administration Point (PAP) and within the programmed logic of the obligations. Further complicating matters is that the obligations often are written in a different programming language than the XACML policy file. To address this drawback, in one general aspect, the present invention is directed to computer-based systems and methods for automatically generating both XACML rules and process-based obligation code using a common set of rules expressed in a suitable representation formalism referencing terms and relationships defined within an ontology, henceforth referred to as ontology-based rules or rulesets. For example, in various embodiments, the XACML rule code as well as the obligation code are automatically generated from such a ruleset. The rules may be centrally maintained and share a common semantic model, which allows the entire authorization decision to be managed holistically.

An advanced requirement of some organizations, such as the US intelligence community, would make some authorization decisions dependent on the results of an external computer-based decision engine. These access control decisions would most likely utilize an obligation. An example of this would be granting access of security information to an audience of effected personnel based on both the results of a complex simulation to determine impacted areas after a nuclear attack. This complex simulation would need to take into account many non-linear factors such as the impact of wind speeds, terrain, wind direction, and so on. One way to achieve this functionality and determine if access should be granted within XACML, is for the obligation to execute the simulation.

FIGURES

Various embodiments of the present invention will be described herein by way of example in conjunction with the following figures, wherein.

DETAILED DESCRIPTION

In the XACML specification, a "policy" (or "policy set") is a set of rules for determining if access should be permitted or denied to a set of resources. A "rule" determines if a subject should be permitted or denied access to a resource based on a variety of attributes and conditions. Because multiple rules may yield conflicting authorization decisions, a rule-combining algorithm can be used to adjudicate these cases. Even if a rule renders a "Permit" authorization decision, there still may be other actions that must be performed when authorization is permitted, referred to as "obligations." For example, the obligations associated with an XACML rule may perform such actions as logging the access, sending a notification, or requesting an additional approval. Obligations are additional requirements associated with an authorization decision. An example of an obligation is where an email must be sent to a patient telling them whenever their records are accessed and by whom. Another example obligation could be a "mother may I" obligation, where the obligation service attempts to seek approval from the system administrator if a user is denied access.

The "target" determines when a rule is to be applied, and can be complex. A target may comprise four attributes: (i) resources, i.e. the resource(s) the user is attempting to access; (ii) subjects, i.e. the user that is attempting to get access; (iii) actions, i.e. that action(s) the user wishes to take (e.g., read, write, delete, etc.); and (iv) environment, e.g., other characteristics that should be taken into consideration (e.g., whether the user is onsite or logged in remotely, etc.).

Figure 1:
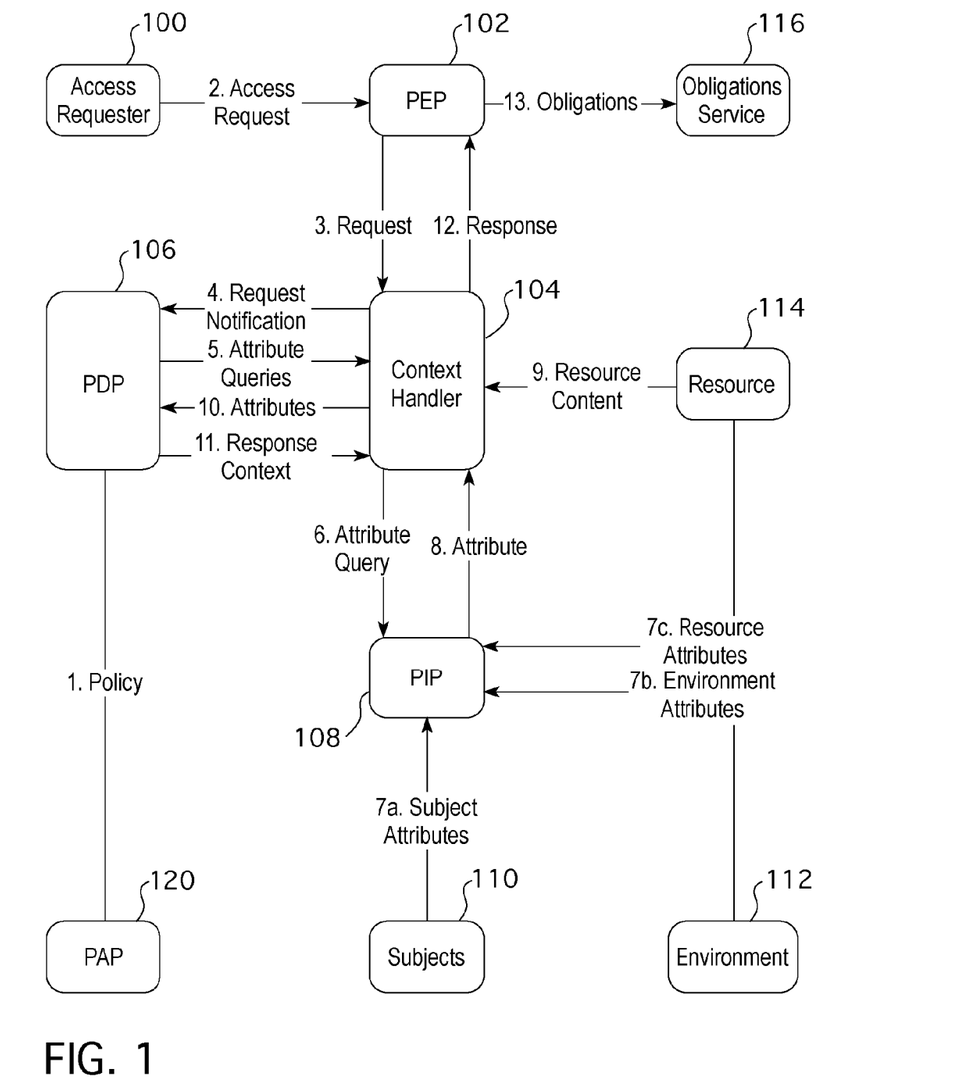
FIG. 1 is a simplified diagram of an authorization system according to various embodiments of the present invention.

FIG. 1 is a diagram of one type of network architecture that can be used to determine a user's authorization to access a resource (such as a file) using XACML. The policies governing authorization, written in XACML code, may be stored at a Policy Administration Point 120 (PAP), which may act as a central repository for the authorization policies. A Policy Decision Point 106 (PDP) may access the policies in the PAP 120 (step 1) to initiate the process to determine whether a particular user is entitled to access a resource.

As shown in FIG. 1, a user (or "access requester") 100 may transmit, from a network-enabled computer device, an access request (step 2) for a resource to a Policy Enforcement Point (PEP) 102. The PEP 102 sends the request to a context handler 104 (step 3), which sends a request notification to the PDP 106 (step 4). To determine whether the user is authorized, the PDP 106 needs to assess attributes of the requester, so the PDP 106 (at step 5) sends attribute queries to the context handler 104, which forwards the attribute queries (step 6) to a Policy Information Point 108 (PIP). Based on the nature of the attribute queries, the PIP 108 may retrieve the necessary attributes from different sources. For example, as shown in FIG. 1, for attributes pertaining to the access requester, the PIP 108 may retrieve attributes about the requester (step 7a) from a subjects source 110; for attributes pertaining to environment issues, the PIP 108 may retrieve attributes from a environment source 112 (step 7b); and the PIP 108 may retrieve attributes about the requested resource 114 (step 7c).

The PIP 108 may then return the attributes to the context handler 104 (step 8), which may also retrieve the requested content from the resource 114 (step 9). The context handler 104 may then submit the attributes to the PDP 106 (step 11), which determines whether access should be permitted or denied. The PDP 106 forwards the response context to the context handler 104 (step 11), which forwards the response to the PEP 102 (step 12). The PEP 102 may then call an obligations service 116 (such as a Web services call) to perform the necessary obligations.

The obligation code that the PEP 102 executes to perform the obligations is usually written in a programming language, such as JAVA, BPEL (Business Process Execution Language), or C++. As noted above, one current flaw with the XACML specification identified by the inventors is that the knowledge leveraged by an XACML compliant system to govern access to a secure resource really resides in multiple places and is therefore fragmented. Such knowledge often can be found in both XACML files residing within the PAP 120 (or PDP 106) as well as within the programmed logic of the services which implement XACML obligations. To address this drawback, according to various embodiments, the XACML policy code and the obligations code may be automatically generated from an ontology-based ruleset—i.e. a set of rules expressed using terms within an ontology. Using such a ruleset to automatically generate the XACML policy code and the obligations code allows the entire authorization decision-making process to be managed holistically. Embodiments of the system diverse and may be implemented leveraging a variety of knowledge representation and ontology standards, including, for example, the IKRIS Knowledge Representation Language (IKL), CycL, or the Semantic Web Rule Language (SWRL) and Web Ontology Language (OWL).

The PAP 120, PDP 106, PEP 102, the PIP 108, and the context handler 104 may be implemented as computer- or processor-based systems. For example, they may be components of an enterprise policy management system. The sources 110, 112, and 114 may be implemented, for example, as databases, including relational and/or non-relational databases.

According to various embodiments, an ontology may be used to define the interpretation of a set of access control rules. Complex concepts mentioned in rules—e.g. the activity invoked by an obligation—may be defined in-terms of more basic concepts within the ontology. For visualization and clarity, such complex concepts may be depicted as "semantic graphs." In various embodiments of the present invention, complex concepts specified by such graphs might be captured in variety of ways, including: named classes within the W3C's Web Ontology Language (OWL), or as collection-denoting non-atomic terms within a language like CycL. A semantic graph can also be viewed as a list of RDF (Resource Description Framework) triples with a "head" concept designated. RDF is a W3C specification.

Figure 2:
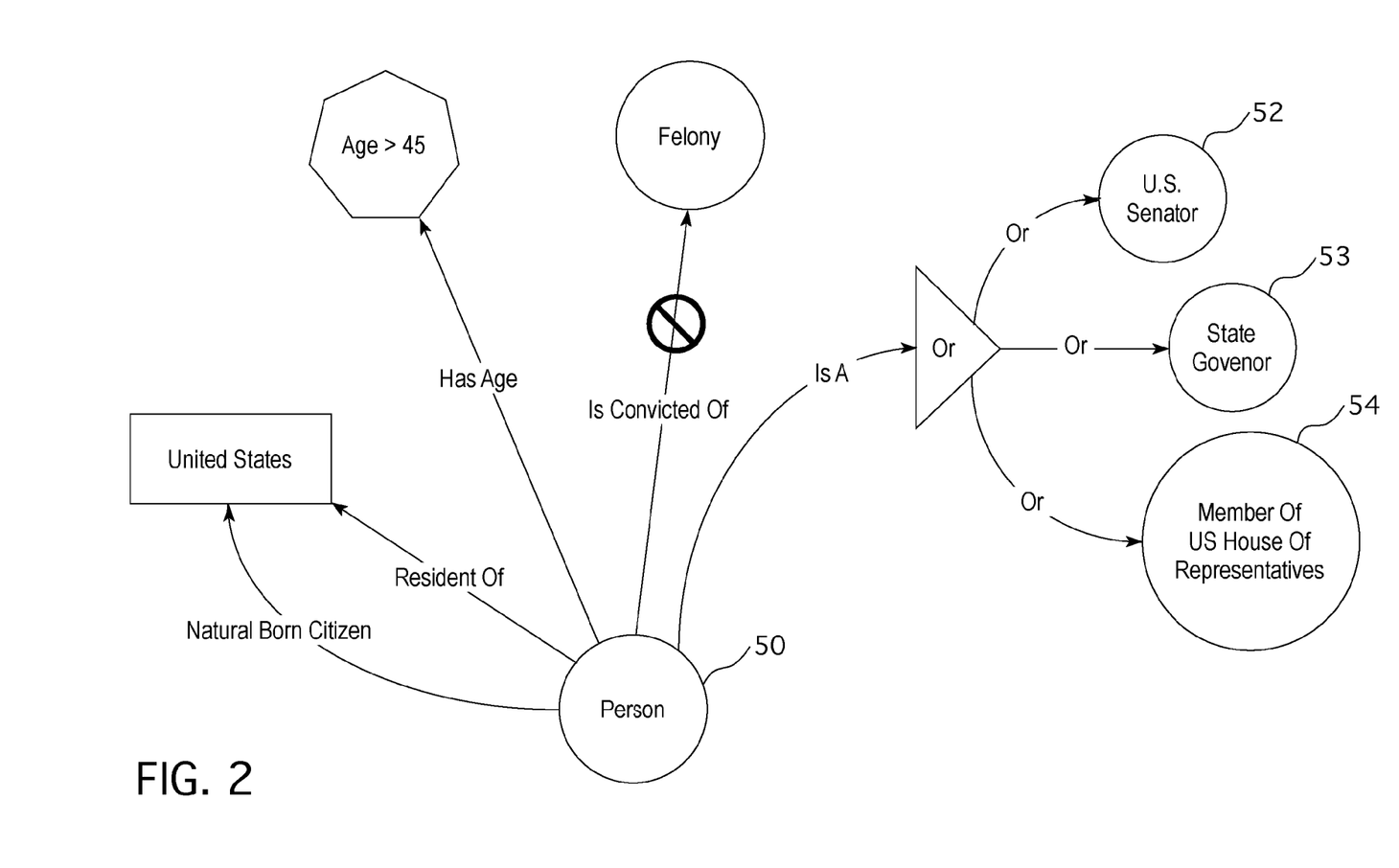
FIGS. 2, 5 and 6 are sample semantic graphs that depict complex types of entities (e.g., kinds of agents or actions) defined within an assumed ontology.

For illustrative purposes, FIG. 2 shows an example of a semantic graph about a person likely to run for president that could be used within a rule. In this example, circles represent classes, rectangles represent instances of classes, and hexagons represent valve restrictions. In various embodiments, these various components may be alternatively described as entities and entity-types, or individuals and collections. The "Ø" symbol represents a "negated" relationship. In this example, the head of the graph, represented by double circle 50, which is the class within the ontology that is being constrained and contextualized, denotes the concept Person. The graph as a whole denotes the restricted set of persons meeting the requirements specified by the structure of the graph. Nodes labeled 52-54—i.e. Senator, State Governor, and Member of House of Representative—represent other classes used to further restrict the type of person denoted by the graph as a whole. So, according to the graph, a person who is likely to run for president (1) is either a senator, state governor, or member of the house representatives, (2) has not been convicted of a felony, (3) is over the age of forty-five, and (4) is a resident and natural born citizen of the U.S.

Figure 3:
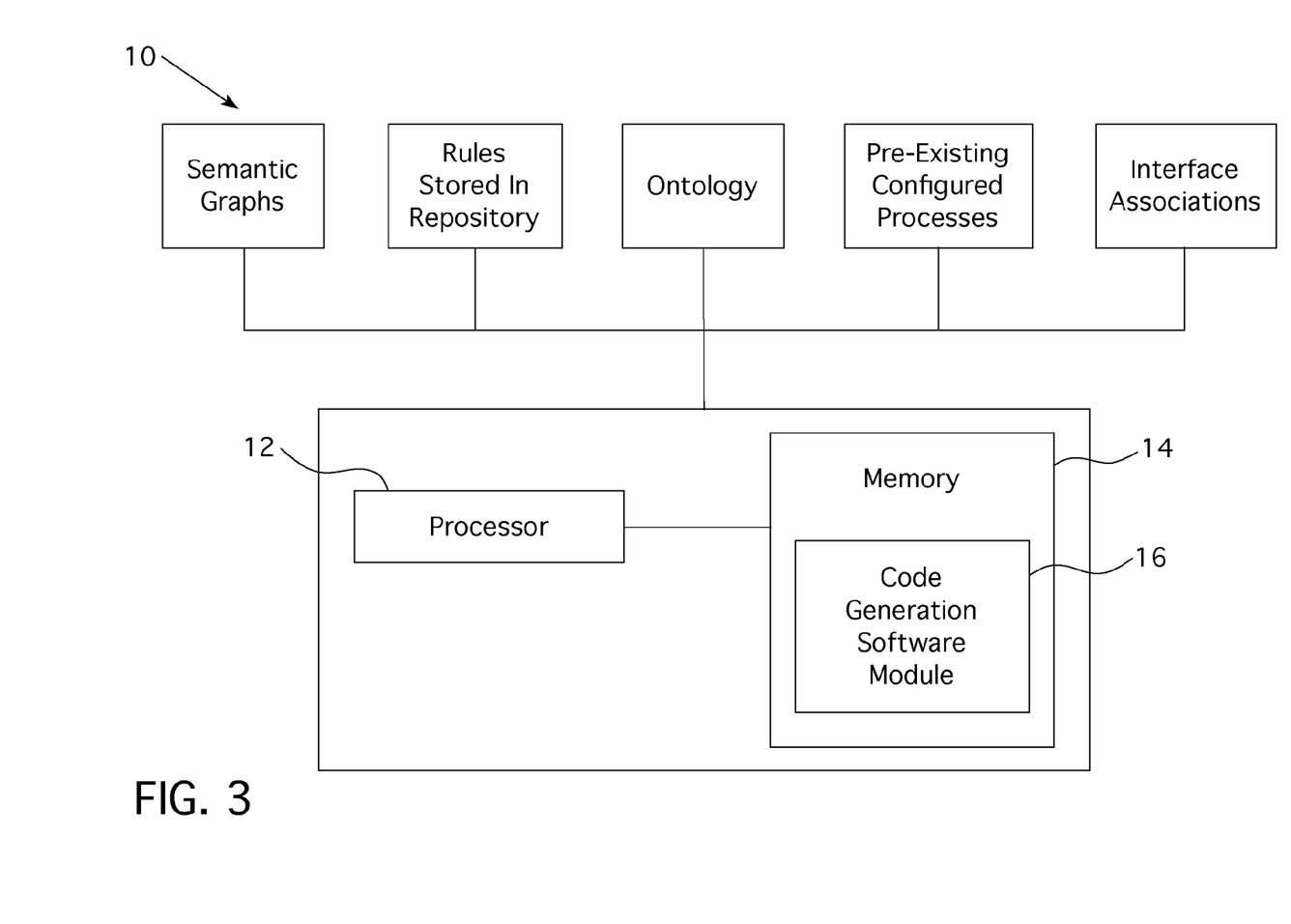
FIG. 3 is a diagram of a computer system for automatically generating the XACML and obligation code according to various embodiments of the present invention.

FIG. 3 is a diagram of a computer system 10 that may be used to automatically generate the codes according to various embodiments of the present invention. The computer system 10 may comprise one or a number of networked computer devices, such as personal computers, laptops, servers, mainframes, supercomputers, or networks of such devices. The computer system 10 may comprise one or more processors 12 and one or more memory units 14, although for convenience, only one of each is shown in FIG. 3. The processor(s) 12 may have a single core or it may comprise multiple cores. The memory unit(s) 14 may comprise a suitable type of computer readable medium, such as RAM or ROM. As shown in FIG. 3, the memory unit 14 may comprise a code generation software module 16. The module 16 may contain instructions or commands, which when executed by the processor 12, cause the processor 12 to generate the XACML policy code and the obligations code, as described in more detail below. The computer system 10, as described below, may automatically generate the code based on data relating to the semantic graphs for the rules, the rules themselves, the common ontology, pre-configured processes, and existing interface associations. This data may be stored in one or more repositories and/of files accessible by the computer system 10.

The code generated by the computer system 10 may then be deployed in an authorization system, such as shown in FIG. 1. For example, the XACML files may be deployed at the PAP 120. The obligation code files may reside on another computer system (not shown) that is in communication with the PEP 102.

Figure 4:
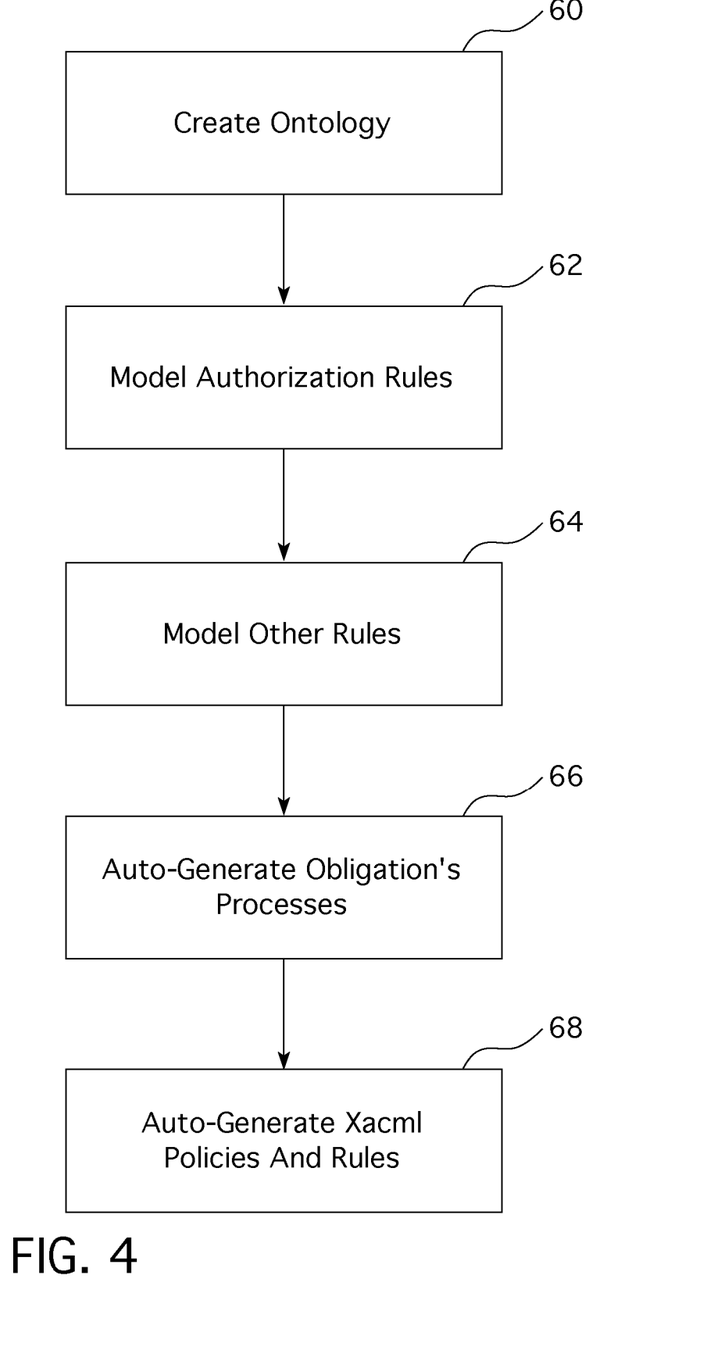
FIG. 4 is a diagram of a process for automatically generating the XACML and obligation code according to various embodiments of the present invention.

FIG. 4 is a diagram of a process to automatically generate the XACML policy code and the obligations code that may be used by the computer system 10 of FIG. 3 according to various embodiments of the present invention. At step 60, an ontology for expressing the concepts to be used within the rules is created. At step 62, the authorization rules may be modeled using, for example, action-denoting authorization concepts, like PermitAcesss or DenyAccess, which represent event types within the ontology. At step 64, the obligations are modeled using other appropriate event types from the ontology to the denote activities associated with the obligation. At step 66, the other rules (if any) used to capture knowledge associated with the obligation may be modeled, including rules for assigning properties, converting units of measure, expressing constraints, and performing calculations, etc. As mentioned above, the content of both XACML policy rules and obligations are captured and formalized using concepts defined within an ontology. The following description of the process assumes that semantic graphs are used to specify the complex concepts used to model access policy rules and obligations, although it should be recognized that other techniques for representing such concepts may be used in other embodiments.

Next, at step 68, the processor 12, executing the code of the code generation software module 16, may automatically generate each of the obligation's processes. This may involve, for steps of the process that either require data or that perform function calls, associating the step with interfaces (or "bindings"), and associating the input and output fields of the interfaces with concepts from the ontology (possibly represented as semantic graphs). That is, if a step of the process requires data, an interface for the source of the data is associated with the step. Similarly, if a step requires a function call that is performed by another system in the network, an interface for calling that function at the other system is associated with the step. According to various embodiments, a standard like the W3C's Web Service Description Language (WSDL) standard may be used to describe the inputs and outputs of such a function call. WSDL is an XML-based language that provides a model for describing Web services. Web services are generally software systems designed to support interoperable machine-to-machine interaction over a network, such as the Internet, and executed on a remote system hosting the requested services. Again, in the case where an existing pre-configured process is being modified, interface associations may be added or deleted as needed, rather than having to associate all of the interfaces again. Based on the rules and bindings, the code may be automatically generated, taking into consideration the complex interdependencies of the rules of the process as well as the sequencing implied by the rules. For each obligation, the computer system 10 may create a file to describe the calling parameters. The calling parameters would be described by ontology-defined terms. The return values of the obligation service would be an XACML <decision> XML message, which returns a permit or deny response. As mentioned before, the obligation code files may be written in JAVA or BPEL, for example.

Then, at step 68, the processor 12, executing the code of the code generation software module 16, may automatically generate all of the XACML policies and rules needed to express each of the "Permit Access" and "Deny Access" rules modeled. This may be done using a process similar to that described above for the obligation code. For each of the obligations, the calling details of the obligation generated at step 66 may be inserted in the XACML code. Further, the obligation code generated at step 66 may be allocated within layers of a SOA (Service-oriented architecture) stack.

Consider the following sample rules:

| | |
|---|---|
| Rule 1: | A person, identified by a patient ID number, may read any record for which he or she is the designated patient. |
| Rule 2: | A physician may write to any medical record for which he or she is the designated primary care physician, provided an email is sent to the patient. |

These example rules are from Moses, T., eXtensible Access Control Markup Language (XACML), Version 2.0, Technical report, OASIS Standard (2005), http://docs.oasis-open.org/xacml/2.0/access_control-xacml-2.0-core-spec-os.pdf, which is incorporated herein by reference. In this example, Rule 1 does not have an obligation, but Rule 2 does—to send an email to the patient. The XACML code that would be generated from these rules is shown in the above-cited document.

Figure 5:
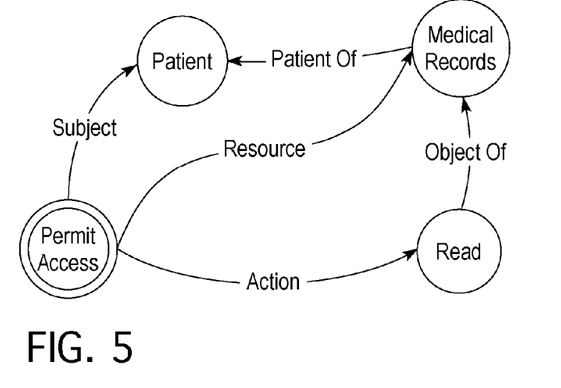

FIG. 5 shows a semantic graph associated with Rule 1. Upon inspection, it appears that two details are omitted from the specification: (1) that a patient is referenced by patient ID; and (2) there is a string restriction of "string-one-and-only." In implementation, these items may not need to be specified because if a patient ID was required this would be discovered based on the binding. In the architecture (see FIG. 1), this function may be handled by the context handler 104, but when the permit access function is bound, the context handler 104 must be told where to get the data. That encoding may be used by the context handler 104 to fetch the data from the proper data store. The "one and only" requirement could be handled by an ontology-based cardinality restriction, which would entail that a patient could only have one patient ID. Several possible embodiments for capturing such constraints include min-/maxCardinality restrictions of OWL, and ArgFormat and quantificational RuleMacroPredicates of CycL.

Figure 6:
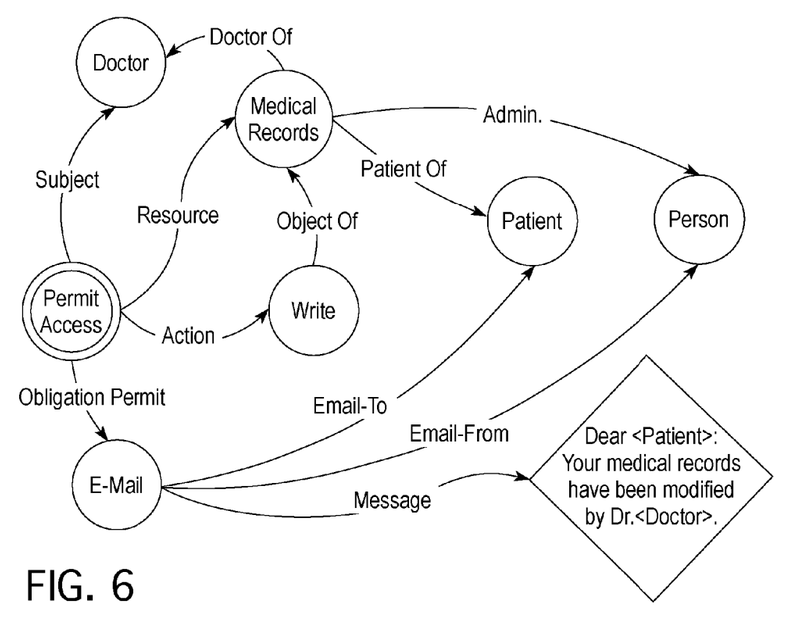

FIG. 6 shows a semantic graph for Rule 2's Permit Access action. In this example, the obligation is represented by a sub-graph headed by Emailing, another type of action defined in the assumed ontology. If the sub-graph is not already a deployed obligation, then the sub-graph must be auto-generated as an obligation, be deployed, and then the PEP 102 (see FIG. 1) must call it as a web service, with a suitable number of ontologically-defined data parameters, and it must wait for a return decision from the obligation service prior to permitting/denying access. Generating the code from a semantic model can be a benefit whether coding complex obligations or standard obligations. For example, imagine a scenario where there is a cost to access an information system, and different formulas exist to calculate the cost of an access, taking into account many factors like time of day, etc. In this case, having this additional knowledge about how to execute an obligation encoded as rules and having auto-generated the additional obligation's Web Service endpoint will allow the user to manage all their access control rules centrally and will help ensure terms referenced in all aspects of the access-control process are interpreted uniformly. Without this holistic solution, one part of their access control policy would be defined in XACML and the other part would be embedded within the code of the obligation.

The return result of an obligation web service endpoint call would be an XACML decision block being returned to the PEP 102, which would contain a Permit or Deny decision.

The rules of a policy may be inter-combined using a rule-combining algorithm. Some of the algorithms would allow a rule that renders a permit decision to override another rule that yields a deny decision and vice versa. So, depending on the algorithm used, some rules could be ignored.

XACML defines a number of combining algorithms that can be identified by a RuleCombiningAlgId or PolicyCombiningAlgId attribute of the <Policy> or <PolicySet> elements, respectively. The rule-combining algorithm defines a procedure for arriving at an authorization decision given the individual results of evaluation of a set of rules. Similarly, the policy-combining algorithm defines a procedure for arriving at an authorization decision given the individual results of evaluation of a set of policies. Standard combining algorithms are defined for: Deny-overrides (Ordered and Unordered); Permit-overrides (Ordered and Unordered); First-applicable; and Only-one-applicable.

In the case of a Deny-overrides algorithm, if a single <Rule> or <Policy> element is encountered that evaluates to "Deny," then, regardless of the evaluation result of the other <Rule> or <Policy> elements in the applicable policy, the combined result is "Deny." Likewise, in the case of a Permit-overrides algorithm, if a single "Permit" result is encountered, then the combined result is "Permit." In the case of a "First-applicable" combining algorithm, the combined result is the same as the result of evaluating the first <Rule>, <Policy> or <PolicySet> element in the list of rules whose target is applicable to the decision request. An "only-one-applicable" policy-combining algorithm only applies to policies. The result of this combining algorithm ensures that one and only one policy or policy set is applicable by virtue of their targets. If no policy or policy set applies, then the result is "NotApplicable," but if more than one policy or policy set is applicable, then the result is "Indeterminate." When exactly one policy or policy set is applicable, the result of the combining algorithm is the result of evaluating the single applicable policy or policy set.

Policies and policy sets may take parameters that modify the behavior of the combining algorithm. Although none of the standard combining algorithms require parameters, it is possible to pass parameters, which may be necessary when writing custom combining algorithms.

As described above, both the XACML code and obligation web-service endpoints are generated from a set of rules sharing a common model. One obligation endpoint may be generated for each different type of obligation. For the XACML files, the option may exist to create one large policy document containing all the rules generated by the process, or to create multiple policy files. Technically all the policies could be in one big file, but it may be more manageable in some cases to create multiple policy files.

The following describes a process for generating the code according to various embodiments. First, some of the global parameters may be set upfront as attributes of the Policy tag. An important one is:

```
RuleSetCombiningAlgId="urn:oasis:names:tc:xacml:1.0:ruleset-
combining-algorithm:deny-overrides">
PolicyCombiningAlgId="urn:oasis:names:tc:xacml:1.0:policy-
combining-algorithm:deny-overrides"> (if multiple policy
files are used)
```

Other defaults would be to set the XPath and other Versions, such as:

```
1124 <PolicyDefaults>
1125     <XPathVersion>http://www.w3.org/TR/1999/Rec-xpath-
1126     19991116</XPathVersion>
1127 </PolicyDefaults>
```

Next, access rules represented within an ontology-based system may be transformed into an XACML policy form, which implements the rule within a PEP. This entails generating an XACML Rule element with attributes set as described below. It will also typically entail generating all the other elements associated with a well-formed XACML rule, including the target, condition, and obligation elements as described below.

Next, for each piece of data required by some obligation, it should be bound to a term from the ontology so it is clear how the information requirements of policy rules and supporting web services can be compared and matched up. Next, the obligation's own WSDL may be generated and used by the PEP.

Besides the Effect attribute noted previously, XACML rules may also contain Description and RuleID attributes. The Effect attribute of an automatically generated XACML rule element will be set to "Permit" or "Deny" based on the action type specified in the ontology based rule—e.g. PermittingAccess or DenyingAccess. The RuleID of an automatically generated XACML rule will also be generated automatically and associated with both the ontology-based rule and the derived XACML form of the rule to help maintain traceability. Finally, the description for an automatically generated XACML rule may be either automatically or manually specified, depending on the availability of suitable natural language generation support for the ontology utilized in a particular embodiment.

As noted above, XACML rules may also contain Target, Condition, and Obligation elements. Specifying a Target element for an automatically generated XACML rule means determining appropriate attributes for identifying the Subjects, Resources, Actions, or Environments, to which the policy rule applies. More specifically, it may entail mapping concepts referenced in the ontology-based rule to whatever AttributeValue and AttributeDesignator values are appropriate for the XACML version of the rule. The various kinds of targets associated with an XACML rule—i.e. subjects, resources, actions and environments—will correspond to different relationships defined within the assumed ontology. These target relationships will be modeled and may be expressed as links in a semantic graph, as illustrated in FIG. 5.

The code generation is best seen by looking at the example code. The code below is trying to detect if anyone is attempting to access a resource with an xpath of /md:record/md:medical, which would be what is meant by the class Medical Records in the action denoting graphs in FIGS. 5 and 6:

```
1487 [a415]  <Resources>
1488 [a416]  <Resource>
1489 [a417]  <ResourceMatch
1490 [a418]
MatchId="urn:oasis:names:tc:xacml:1.0:function:xpath-node-
match">
1491 [a419]  <AttributeValue
1492 [a420]
DataType="http://www.w3.org/2001/XMLSchema#string">
1493 [a421]  /md:record/md:medical
1494 [a422]  </AttributeValue>
1495 [a423]  <ResourceAttributeDesignator
1496
AttributeId="urn:oasis:names:tc:xacml:1.0:resource:xpath"
1497 [a424]
DataType="http://www.w3.org/2001/XMLSchema#string"/>
1498 [a425]  </ResourceMatch>
1499 [a426]  </Resource>
1500 [a427]  </Resources>
```

The purpose of the binding would be to map between these two representations, in this case Medical Records to /md:record/md:medical. Bindings were created for this purpose, to take a semantic concept and map it into the customer's computing environment. In this case, the inputs are just mapped into Xpath or URNs and other similar types of location statements. For many types of accesses like URNs and URLs, a standard "string-equals" function would be used to determine the match:

MatchId="urn:oasis:names:tc:xacml:1.0:function:string-equal"

The conditions associated with a rule, as mentioned above, may map into the functions provided by the XACML 2.0 specification at section 10.2.8, including all the logical and comparative functions. Some special care may be needed to map the time/date functions into XACML, depending on how the time/date are represented within the ontology used for a particular embodiment. For example, in an embodiment based on OWL/RDF, specification of dates and times might be handled via datatype properties (e.g., xsd:time/xsd:date). In this case, the mapping will be relatively straightforward. However, in other embodiments, such as one where times and dates are represented by terms within the ontology itself— e.g. as instances of the CycL collection #$Date—this mapping may be a bit more involved.

Consider the following code:

```
1516 [a442] <Condition>
1517 [a443] <Apply
FunctionId="urn:oasis:names:tc:xacml:1.0:function:string-
equal">
1518 [a444] <Apply
1519 [a445]
FunctionId="urn:oasis:names:tc:xacml:1.0:function:string-
one-and-only">
1520 [a446] <SubjectAttributeDesignator
1521 [a447]
AttributeId="urn:oasis:names:tc:xacml:2.0:example:
1522 attribute:physician-id"
1523 [a448]
DataType="http://www.w3.org/2001/XMLSchema#string"/>
1524 [a449] </Apply>
1525 [a450] <Apply
1526 [a451]
FunctionId="urn:oasis:names:tc:xacml:1.0:function:string-
one-and-only">
1527 [a452] <AttributeSelector RequestContextPath=
1528 [a453] "//xacml-context:Resource/xacml1529
context:ResourceContent/md:record/md:primaryCarePhysician/
md:registrationID/text(
1530 )"
1531 [a454]
DataType="http://www.w3.org/2001/XMLSchema#string"/>
1532 [a455] </Apply>
1533 [a456] </Apply>
1534 [a457] </Condition>
```

Here the condition is attempting to see if the physician-id denoted by the URN of urn:oasis: . . . attribute:physician-id matches the primary care physician of record, denoted by the XPath of //xacml . . . /md:primaryCarePhysician/md:registrationID/text( ). These two items are compared using the string-equal function.

Generating the obligations may be driven by the binding for the obligation. If one looks at the structure of the obligation, all obligations may be enclosed with an <Obligations> XML tag block and then each individual obligation may be with an <Obligation> XML tag block. The parameters of the binding may need to be made <AttributeAssignment> parameters. The obligation below sends an email [1538] to the patient's email address [1544] with the message within line [1550], which includes the physician's name.

```
1536 [a459]  <Obligations>
1537 [a460]  <Obligation
1538
ObligationId="urn:oasis:names:tc:xacml:example:obligation:email"
1539 [a461]  FulfillOn="Permit">
1540 [a462]  <AttributeAssignment
1541
AttributeId="urn:oasis:names:tc:xacml:2.0:example:attribute
:mailto"
1542 [a463]
DataType="http://www.w3.org/2001/XMLSchema#string">
1543 [a464]  <AttributeSelector RequestContextPath=
1544 [a465]
"//md:/record/md:patient/md:patientContact/md:email"
1545 [a466]
DataType="http://www.w3.org/2001/XMLSchema#string"/> ;
1546 [a467]  </AttributeAssignment>
1547 [a468]  <AttributeAssignment
1548
AttributeId="urn:oasis:names:tc:xacml:2.0:example:attribute
:text"
1549 [a469]
DataType="http://www.w3.org/2001/XMLSchema#string">
1550 [a470]  Your medical record has been accessed by:
```

-continued

```
1551 [a471]  </AttributeAssignment>
1552 [a472]  <AttributeAssignment
1553
AttributeId="urn:oasis:names:tc:xacml:2.0:example:attribute
:text"
1554 [a473]
DataType="http://www.w3.org/2001/XMLSchema#string">
1555 [a474]  <SubjectAttributeDesignator
1556
AttributeId="urn:oasis:names:tc:xacml:1.0:subject:subject-
id"
1557 [a475]
DataType="http://www.w3.org/2001/XMLSchema#string"/>
1558 [a476]  </AttributeAssignment>
1559 [a477]  </Obligation>
1560 [a478]  </Obligations>
```

Each Obligation may be implemented as a separate process to implement that particular obligation. The rules used to generate an obligation may be inter-combined to form a process which reflects the complex interdependencies of the rules. One way of doing this is described in U.S. provisional application Ser. No. 60/922,477, filed 9 Apr. 2007, entitled "Building a business process code library for pre-configured processes," and U.S. non-provisional application Ser. No. 12/082,146, filed 9 Apr. 2008, entitled "Creating deployable software code for implementing a business process using a library of preconfigured processes," both of which are incorporated herein by reference in their entirety. One of the outputs from the auto-generation of the obligation could invoke a subsequent call to another auto-generated process. The one constraint on any obligation endpoint would be that its return value is an XACML <decision> XML message which would return a Permit or Deny.

As mentioned above, an advanced requirement of some organizations, such as the US intelligence community, would make some authorization decisions dependent on the results of an external computer-based decision engine. These access control decisions would not be possible to be encoded into the current schema for specifying XACML rules, without burying them within an obligation. An example of this would be the opening up of security information to an audience of effected personnel based on the results of a complex simulation to determine impacted areas after a nuclear attack. This complex simulation would need to take into account many non-linear factors such as the impact of wind speeds, terrain, wind direction, and so on. Accordingly, according to various embodiments, the simulation could be executed as part of an obligation, the code for which may be automatically generated as described above using the same semantic model used to automatically generate the XACML policy files.

In various embodiments, therefore, the present invention is directed to a system 10 for automatically generating code for an authorization policy for network resources. The system may comprise: one or more processors 12; and a memory 14 in communication with the one or more processors. The memory 14 contains instructions that when executed by the one or more processors 12, cause the one or more processors to: automatically generate obligation code for the policy, where the obligations of the policy first have been captured as rule-based knowledge in a suitable representation language using an ontological model; and ii) automatically generate XACML rule code for the policy based on a similar set of rules expressed in a similar formalism and leveraging the same ontological model. The automatically generated obligation code may associate at least one step of an obligation of the policy with an interface (or binding). An input field and/or an output field of the interface may be associated with a semantic graph representing a (potentially complex) concept from the ontology. In addition, WSDL may be used to describe the input field and/or the output field of the interface.

In another embodiment, the present invention is directed to a computer product that comprises a computer readable medium (CRM). The CRM has stored thereon instructions that, when executed by a processor 12, causes the processor 12 to: automatically generate obligation code for an authorization policy for network resources, where rules of the policy are modeled using an ontologically defined ruleset; and automatically generate XACML rule code for the policy based on the same ontologically defined ruleset.

In yet another embodiment, the present invention is directed to a computer-implemented method for automatically generating code for an authorization policy for network resources. The method comprises the steps of: automatically generating, by a computer system 10 comprising a code generation software module 16, obligation code for the policy, wherein rules of the policy are modeled using an ontologically defined ruleset; and automatically generating, by the computer system, XACML rule code for the policy based on the same ontologically defined ruleset. The method additionally may comprise the step of deploying XACML rule code and obligation code. For example, the XACML rule code may be deployed at the PAP 120 of the computer-based authorization architecture 10 (see FIG. 1).

The examples presented herein are intended to illustrate potential and specific implementations of the embodiments. It can be appreciated that the examples are intended primarily for purposes of illustration for those skilled in the art. No particular aspect of the examples is/are intended to limit the scope of the described embodiments. It is further to be understood that the figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware and/or hardware. The software and firmware code may be executed by a processor or any other similar computing device. The software code or specialized control hardware that may be used to implement embodiments is not limiting. For example, embodiments described herein may be implemented in computer software using any suitable computer software language type, such as, for example, Java, C or C++ using, for example, conventional or object-oriented techniques. Moreover, aspects of the invention requiring knowledge representation and ontology modeling may be implemented partially or wholly under a variety of formalisms and standards including, but not limited to, RDF/OWL, Semantic Web Rule Language (SWRL), IKRIS Knowledge Language (IKL), CycL, and Process Specification Language (PSL). Such software may be stored on any type of suitable computer-readable medium or media, such as, for example, a magnetic or optical storage medium. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers or computer systems and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media. Such media may include any of the forms listed above with respect to storage devices and/or, for example, a modulated carrier wave, to convey instructions that may be read, demodulated/decoded, or executed by a computer or computer system.

It can also be appreciated that certain process aspects described herein may be performed using instructions stored on a computer-readable medium or media that direct a computer system to perform the process steps. A computer-readable medium may include, for example, memory devices such as diskettes, compact discs (CDs), digital versatile discs (DVDs), optical disk drives, or hard disk drives. A computer-readable medium may also include memory storage that is physical, virtual, permanent, temporary, semipermanent, and/or semitemporary.

A "computer," "computer system," "host," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A system for automatically generating code for an authorization policy for network resources, the system comprising:
   one or more processors; and
   a memory in communication with the one or more processors, wherein the memory contains instructions that when executed by the one or more processors, cause the one or more processors to:
   automatically generate obligation code for the policy, in a first programming language, wherein rules of the policy are modeled using an ontologically defined ruleset, wherein the obligation code includes a plurality of function calls; and
   after generating the obligation code, automatically generate XACML rule code for the policy based on the same ontologically defined ruleset, wherein the first programming language is not XACML, wherein the one or more processors are programmed to generate the XACML rule code for the policy by inserting calling details for each of the plurality of function calls of the obligation code in the XACML code.

2. The system of claim 1, wherein the memory stores instructions that, when executed by the one or more processors, cause the one or more processors to automatically generate obligation code by associating at least one step of an obligation of the policy with an interface.

3. The system of claim 2, wherein an input field and/or an output field of the interface is associated with a concept from the ontology.

4. The system of claim 3, wherein the concept from the ontology is represented by a semantic graph.

5. The system of claim 2, wherein WSDL is used to describe the input field and/or the output field of the interface.

6. The system of claim 5, wherein the memory stores instructions that, when executed by the one or more processors, cause the one or more processors to automatically generate obligation code by automatically generating obligation code based on each rule and interface of the policy.

7. The system of claim 1, wherein the memory stores instructions that, when executed by the one or more processors, cause the one or more processors to automatically generate XACML rule code for each modeled rule of the policy.

8. The system of claim 1, wherein the first programming language comprises Business Process Execution Language (BPEL).

9. The system of claim 1, wherein the first programming language comprises Java.

10. A method for automatically generating code for an authorization policy for network resources, the method comprising:
    automatically generating, by a computer system comprising a code generation software module, obligation code for the policy, in a first programming language, wherein rules of the policy are modeled using an ontologically defined ruleset, wherein the obligation code includes a plurality of function calls; and
    after generating the obligation code, automatically generating, by the computer system, XACML rule code for the policy based on the same ontologically defined ruleset, wherein the first programming language is not XACML, and wherein generating the XACML rule code for the policy comprises inserting calling details for each of the plurality of function calls of the obligation code in the XACML code.

11. The method of claim 10, wherein automatically generating the obligation code comprises associating at least one step of an obligation of the policy with an interface.

12. The method of claim 11, wherein an input field and/or an output field of the interface is associated with a concept from the ontology.

13. The method of claim 12, wherein the concept from the ontology is represented by a semantic graph.

14. The method of claim 11, wherein WSDL is used to describe the input field and/or the output field of the interface.

15. The method of claim 14, wherein automatically generating the obligation code comprises automatically generating the obligation code based on each rule and interface of the policy.

16. The method of claim 10, wherein automatically generating the XACML rule code comprises automatically generating the XACML rule code for each modeled rule of the policy.

17. The method of claim 10, further comprising deploying the automatically generated obligation code and the automatically generated XACML rule code in a computer-based authorization architecture.

18. The method of claim 17, wherein the step of deploying comprises deploying XACML rule code at a Policy Administration Point (PAP) of the computer-based authorization architecture.

19. The method of claim 10, wherein:
    the XACML code comprises access policies for network resources; and
    the obligation code comprises simulation code that is executed prior to generating the XACML code in order to formulate the access policies for the network resources.

* * * * *

UNITED STATES PATENT AND TRADEMARK OFFICE
CERTIFICATE OF CORRECTION

PATENT NO. : 9,323,938 B2
APPLICATION NO. : 12/347042
DATED : April 26, 2016
INVENTOR(S) : Glazier et al.

It is certified that error appears in the above-identified patent and that said Letters Patent is hereby corrected as shown below:

In the specification,

COL. 3, LINE 37

Delete "Embodiments of the system diverse and may be implemented" and substitute therefor --Embodiments of the system are diverse and may be implemented--.

COL. 4, LINES 40-41

Delete "This data may be stored in one or more repositories and/of files accessible by the computer system." and substitute therefor --This data may be stored in one or more repositories and/or files accessible by the computer system.--.

COL. 4, LINES 57-58

Delete "using other appropriate event types from the ontology to the denote activities associated with the obligation." and substitute therefor --using other appropriate event types from the ontology to denote the activities associates with the obligation.--.

Signed and Sealed this
Second Day of August, 2016

Michelle K. Lee
*Director of the United States Patent and Trademark Office*